United States Patent
Kondo et al.

(10) Patent No.: US 9,150,680 B2
(45) Date of Patent: *Oct. 6, 2015

(54) RADICALLY POLYMERIZABLE COMPOSITION, CURED PRODUCT THEREOF, AND PLASTIC LENS

(75) Inventors: Akihiro Kondo, Sakura (JP); Atsuhisa Miyawaki, Sakura (JP); Nobuo Kobayashi, Ichihara (JP); Naoya Ikushima, Sakura (JP); Kazuaki Hatsusaka, Kita-Adachi-gun (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/384,060

(22) PCT Filed: Mar. 12, 2012

(86) PCT No.: PCT/JP2012/056258
§ 371 (c)(1),
(2), (4) Date: Sep. 9, 2014

(87) PCT Pub. No.: WO2013/136410
PCT Pub. Date: Sep. 19, 2013

(65) Prior Publication Data
US 2015/0057422 A1    Feb. 26, 2015

(51) Int. Cl.
```
C08F 220/18    (2006.01)
G02B 1/04      (2006.01)
C08F 222/10    (2006.01)
C08F 222/14    (2006.01)
C08F 222/20    (2006.01)
C08K 5/101     (2006.01)
```

(52) U.S. Cl.
CPC ......... *C08F 220/18* (2013.01); *C08F 222/1006* (2013.01); *C08F 222/14* (2013.01); *C08F 222/20* (2013.01); *G02B 1/041* (2013.01); *C08K 5/101* (2013.01); *C08K 2201/014* (2013.01)

(58) Field of Classification Search
CPC .... C08F 212/32; C08F 212/34; C08F 212/04; C08F 220/06; C08F 220/10; C08F 220/68; C08F 283/10; C08F 283/105; C08F 220/18; C08F 220/20; C08F 222/14; G02B 1/041; C08K 5/101; C08K 2201/014
USPC ............. 526/326, 323.2, 323.1, 321, 280, 32; 525/404, 407, 48, 31
See application file for complete search history.

(56) References Cited

FOREIGN PATENT DOCUMENTS

| | | | |
|---|---|---|---|
| JP | 02-308202 A | | 12/1990 |
| JP | 02308202 A | * | 12/1990 |
| JP | 03-106918 A | | 5/1991 |
| JP | 04-325508 A | | 11/1992 |
| JP | 06-134772 A | | 5/1994 |
| JP | 06134772 A | * | 5/1994 |
| JP | 07-002939 A | | 1/1995 |
| JP | 2007-084815 A | | 4/2007 |
| JP | 2007-277456 A | | 10/2007 |
| JP | 2008-094987 A | | 4/2008 |
| JP | 2012-082386 A | | 4/2012 |
| WO | WO-2005/033061 A1 | | 4/2005 |

OTHER PUBLICATIONS

Tohru Kishida et al., "Strong Organic Acids as Efficient Catalysts for the Chloromethylation of m-Xylene: The Synthesis of 1,3-bis(Chloromethyl)-4,6-dimethylbenzene," Ind. Eng. Chem. Res. 2009, vol. 48, pp. 1831-1839.
International Search Report mailed May 29, 2012, issued for PCT/JP2012/056258.

* cited by examiner

*Primary Examiner* — Michael M Bernshteyn
(74) *Attorney, Agent, or Firm* — Locke Lord LLP

(57) ABSTRACT

There are provided a radically polymerizable composition that has a low viscosity suitable for use in coating and that forms a cured product having a high refractive index, a cured product formed by curing the composition, and plastic lens formed by curing the composition. The radically polymerizable composition includes, as essential components, phenylbenzyl acrylate (A); and bis[(meth)acryloylmethyl]biphenyl (B) or biphenyl compound (C) having a molecular structure in which biphenyl structures are bonded to each other through a methylene.

20 Claims, 6 Drawing Sheets

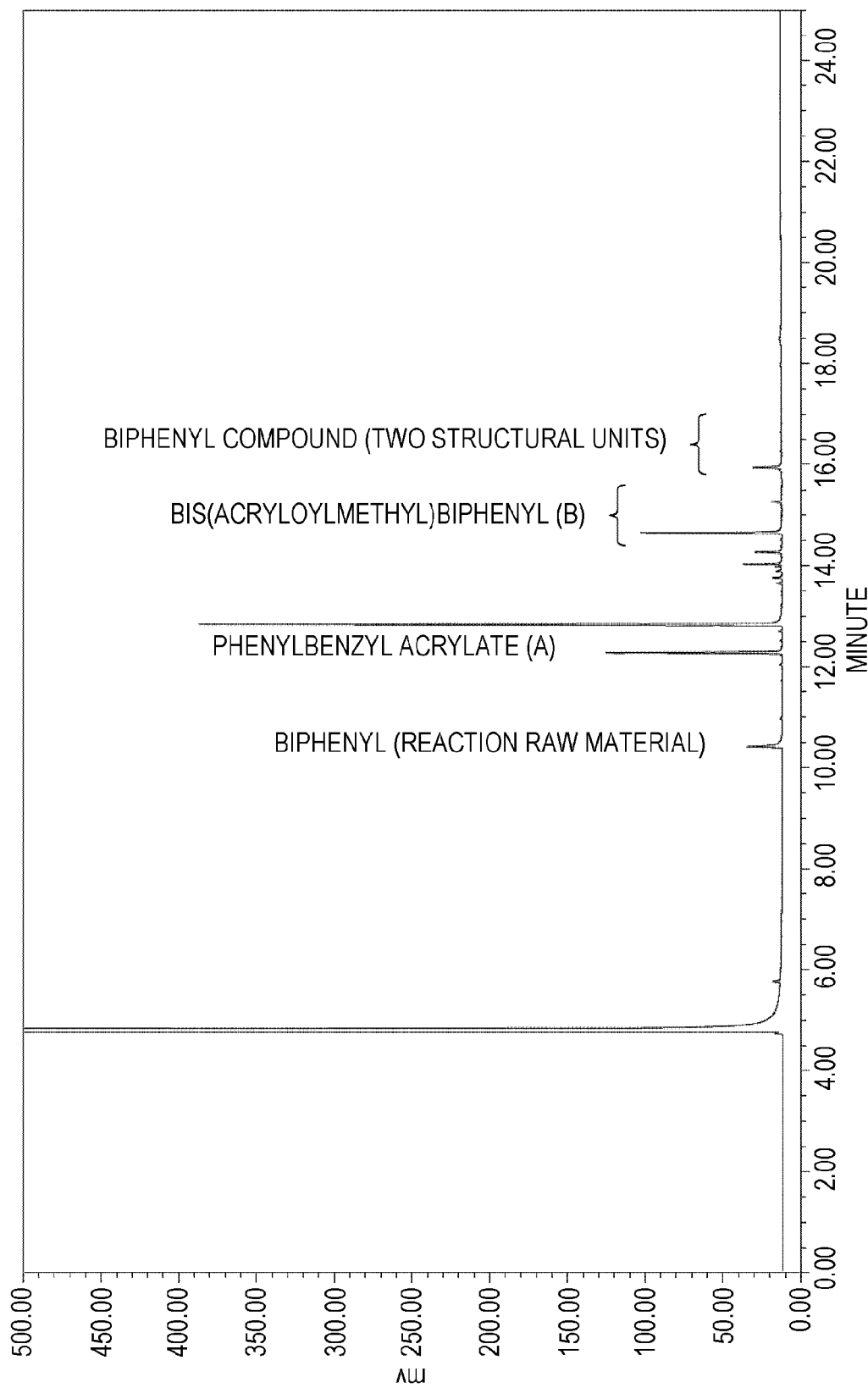

RADICALLY POLYMERIZABLE COMPOSITION, CURED PRODUCT THEREOF, AND PLASTIC LENS

TECHNICAL FIELD

The present invention relates to a radically polymerizable composition, a cured product prepared by curing the composition, and a plastic lens formed of the composition.

BACKGROUND ART

Recently, resin materials have been widely used in optical parts such as an optical over-coating agent, a hard coating agent, an antireflection film, an eyeglass lens, an optical fiber, an optical waveguide, and a hologram because resin materials have good workability and high productivity. Resin materials having a high refractive index have been anticipated due to the trend of reducing the sizes and thicknesses of optical parts or from the viewpoint of controlling antireflection property. In particular, there have recently been growing demands for reduction in size and increases in resistivity and brightness in liquid crystal display elements used as a display of a liquid crystal television, a notebook computer, a portable gaming device, a cellular mobile phone, or the like. To meet these demands, it is essential to increase the refractive index of prism sheets.

Manufacture of formed materials such as a prism sheet requires optical materials having a high refractive index and a low viscosity. However, existing resin materials have a problem in that an increase in refractive index results in an increase in viscosity and leads to crystallization.

There has recently been proposed, as an optical material having a high refractive index, a compound having a fluorene skeleton to provide a material having a high refractive index. Known examples of such a compound include a difunctional compound in which an acryloyl group is bonded to a fluorene skeleton through an alkyleneoxy group (see PTLs 1 to 3); and a compound produced by reacting a diglycidyl ether having a fluorene skeleton with acrylic acid or methacrylic acid (see PTL 4). These compounds have received attention since they have high heat resistance and a high refractive index. However, these fluorene derivatives have the following problem. These fluorene derivatives are generally solids or liquids having a high viscosity of several tens of Pa·s or more at ordinary temperature. Therefore, when these fluorene derivatives are used for formed materials such as a prism sheet, dilution with a large amount of reactive diluent or the like is required to achieve an adequate viscosity. This reduces the refractive index of the resulting cured product.

Examples of currently used reactive diluents include phenylthioethyl acrylate (PTEA), o-phenylphenoxyethyl acrylate (OPPEA), and naphthylthioethyl acrylate (NTEA). PTEA, despite having a high refractive index and a low viscosity, is not preferable because of its poor lightfastness and strong odor due to sulfur contained therein, which results in poor workability. NTEA is unsatisfactory in terms of lightfastness since it has a naphthalene ring. Thus, currently, OPPEA is often selected.

A combination of a difunctional (meth)acrylate compound having a fluorene skeleton and OPPEA has been proposed as a composition for use in optical materials (see PTL 5). However, OPPEA, despite being a reactive diluent having a relatively high refractive index of 1.576, fails to reduce the viscosity of the difunctional (meth)acrylate compound having a fluorene skeleton sufficiently when used alone. Therefore, an example described in PTL 5 employs a reactive diluent as a third component. Thus, a reactive diluent that has a high refractive index and that allows the resulting composition to have a sufficiently low viscosity for formed material use has been anticipated.

CITATION LIST

Patent Literature

PTL 1: Japanese Unexamined Patent Application Publication No. 04-325508
PTL 2: Japanese Unexamined Patent Application Publication No. 2007-84815
PTL 3: International Publication No. WO2005/033061
PTL 4: Japanese Unexamined Patent Application Publication No. 03-106918
PTL 5: Japanese Unexamined Patent Application Publication No. 2008-94987

Non Patent Literature

NPL 1: Ind. Eng. CHEM. RES. 2009, 48, 1831-1839

SUMMARY OF INVENTION

Technical Problem

An object of the present invention is to provide a radically polymerizable composition that has a low viscosity suitable for use in coating and that forms a cured product having a high refractive index, and a cured product and a plastic lens that are formed by curing the composition.

Solution to Problem

The inventors of the present invention have conducted extensive studies to achieve the object and, as a result, have found that a radically polymerizable composition having a high refractive index suitable for use in optical materials and a low viscosity can be provided by including phenylbenzyl acrylate; and bis[(meth)acryloylmethyl]biphenyl or a biphenyl compound having a molecular structure in which biphenyl structures are bonded to each other through a methylene.

Accordingly, the present invention relates to a radically polymerizable composition including phenylbenzyl (meth) acrylate (A); and bis[(meth)acryloylmethyl]biphenyl (B) or a biphenyl compound (C) having a molecular structure in which biphenyl structures are bonded to each other through a methylene.

The present invention also relates to a radically polymerizable composition further including, in addition to the phenylbenzyl (meth)acrylate (A), the bis[(meth)acryloylmethyl] biphenyl (B), and the biphenyl compound (C) having a molecular structure in which biphenyl structures are bonded to each other through a methylene, a (meth)acrylate compound (Y) having a fluorene skeleton.

The present invention further relates to a cured product formed by curing the radically polymerizable composition.

The present invention further relates to a plastic lens formed of the radically polymerizable composition.

Advantageous Effects of Invention

According to the present invention, there can be provided a radically polymerizable composition that has a low viscosity suitable for use in coating and that forms a cured product having a high refractive index, and a cured product and a plastic lens that are formed by curing the composition.

The radically polymerizable composition according to the present invention can be widely applied to optical parts such as an optical over-coating agent, a hard coating agent, an antireflection film, an eyeglass lens, an optical fiber, an optical waveguide, a hologram, and a prism.

BRIEF DESCRIPTION OF DRAWINGS

FIG. 6 is a gas chromatograph of a mixture (1) prepared in Production Example 6.

DESCRIPTION OF EMBODIMENTS

Figure 1:
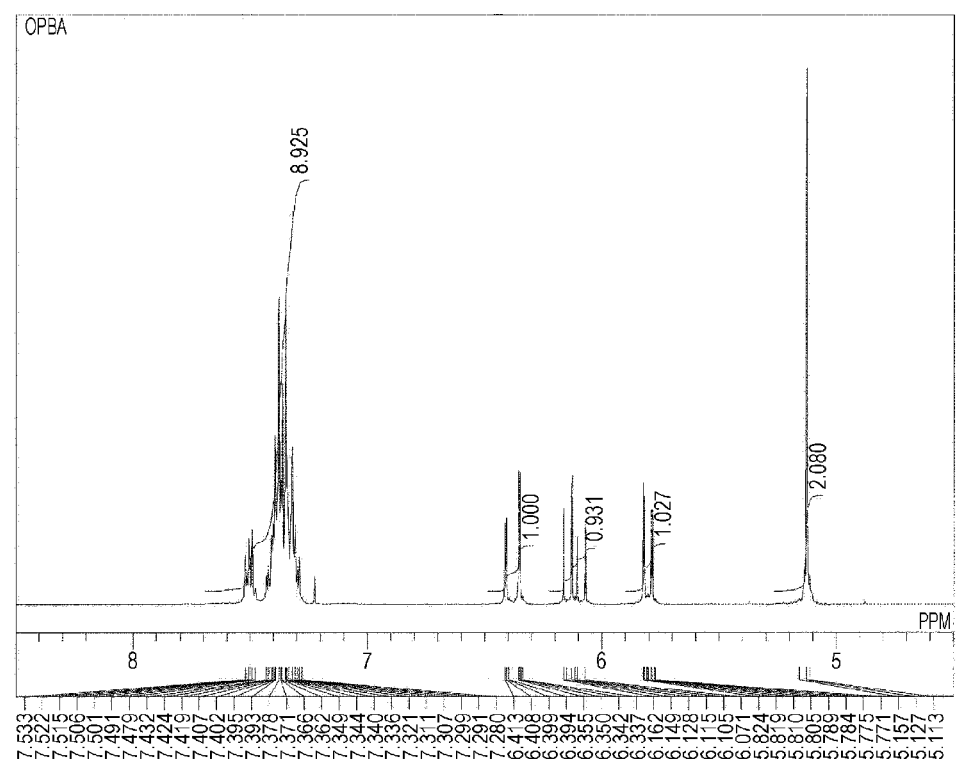
FIG. 1 is a $^1$H-NMR spectrum of ortho-phenylbenzyl acrylate prepared in Production Example 1.
Figure 2:
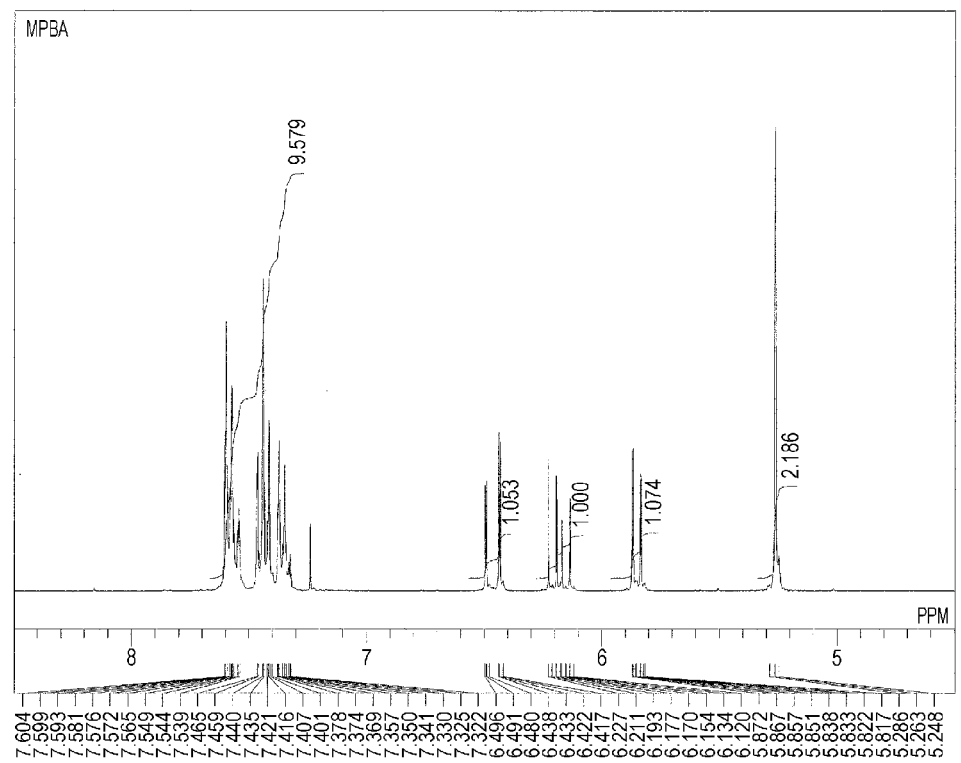
FIG. 2 is $^1$H-NMR of meta-phenylbenzyl acrylate prepared in Production Example 2.
Figure 3:
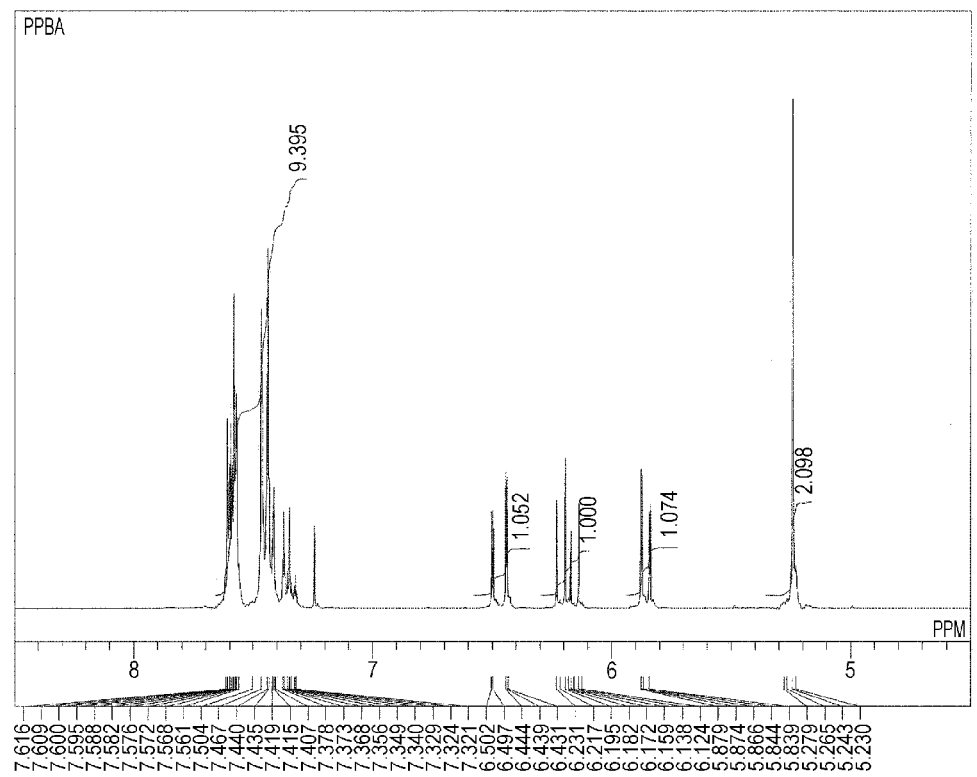
FIG. 3 is $^1$H-NMR of para-phenylbenzyl acrylate prepared in Production Example 3.
Figure 4:
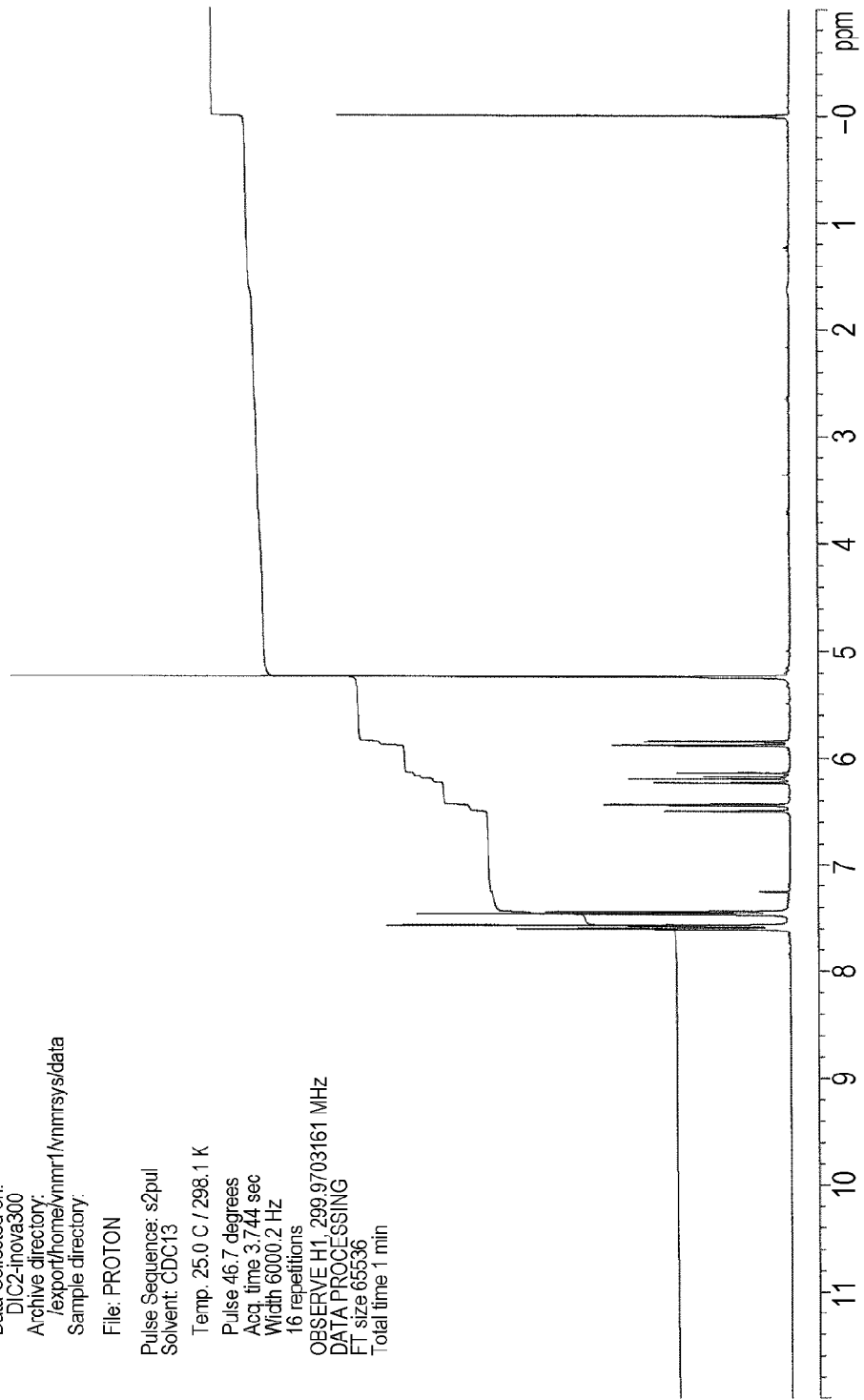
FIG. 4 is $^1$H-NMR of 4,4'-bis(acryloylmethyl)biphenyl prepared in Production Example 4.
Figure 5:
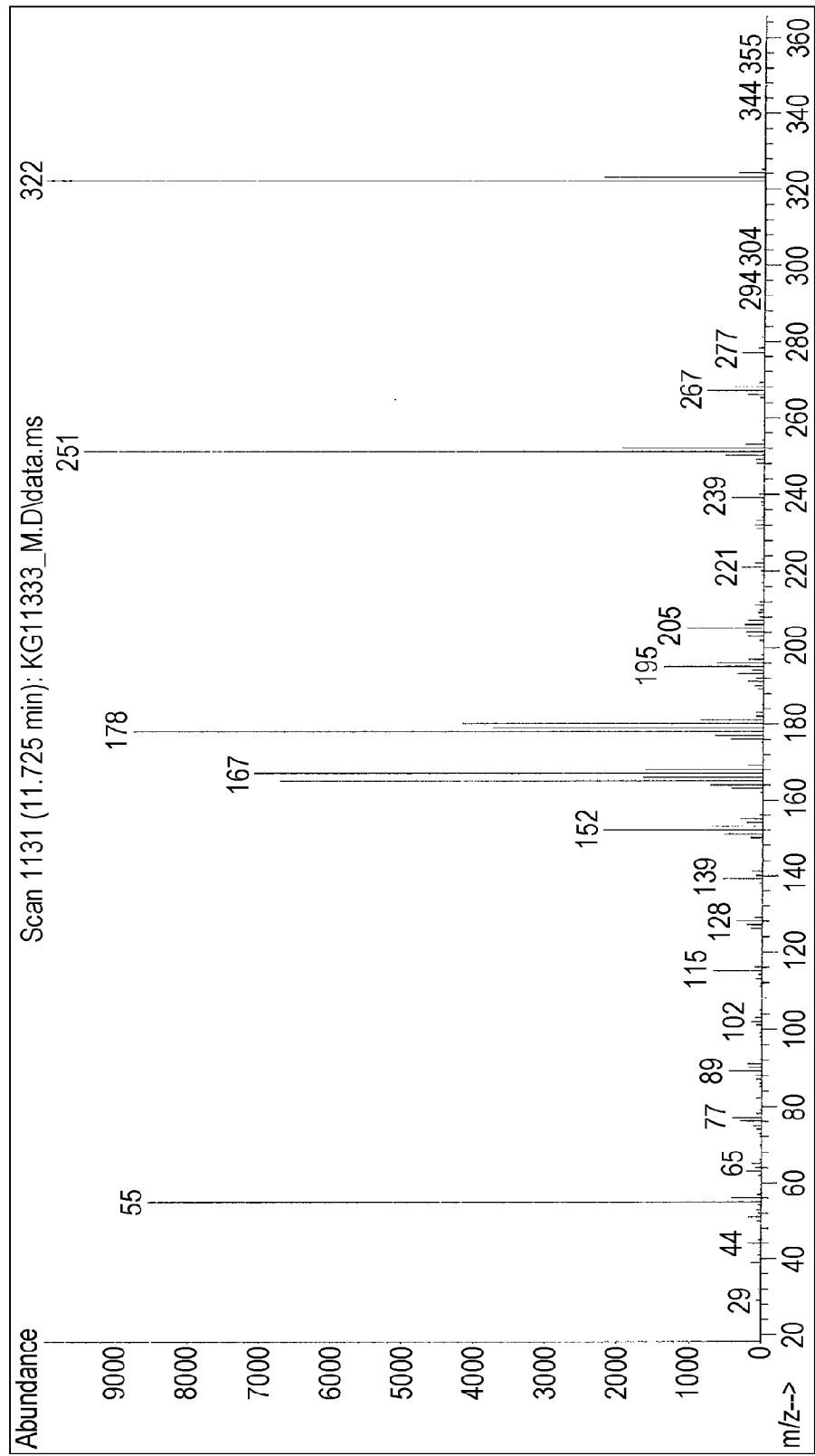
FIG. 5 is a mass spectrum of 4,4'-bis(acryloylmethyl)biphenyl prepared in Production Example 4.

Phenylbenzyl (meth)acrylate (A) included in a radically polymerizable composition according to the present invention may be ortho-phenylbenzyl (meth)acrylate (OPBA), meta-phenylbenzyl (meth)acrylate (MPBA), or para-phenylbenzyl (meth)acrylate (PPBA). These compounds may be used alone or in combination of two or more. Among these compounds, ortho-phenylbenzyl (meth)acrylate and meta-phenylbenzyl (meth)acrylate are preferable because they have a relatively high refractive index and a low viscosity: a refractive index of 1.57 or more and a viscosity of 30 mPa·s or less in the form of a liquid at 25° C. Para-phenylbenzyl acrylate is also preferable because it has a considerably high refractive index of 1.59 or more in the form of a liquid at 40° C., while being solid at ordinary temperature.

In particular, ortho-phenylbenzyl (meth)acrylate, meta-phenylbenzyl (meth)acrylate, and para-phenylbenzyl (meth)acrylate are preferably used in combination in order to achieve both a sufficiently low viscosity of the composition and a sufficiently high refractive index of the cured product formed of the composition. In this case, the mixing ratio is preferably set in such a manner that the molar ratio of ortho-phenylbenzyl (meth)acrylate and meta-phenylbenzyl (meth)acrylate to para-phenylbenzyl (meth)acrylate [{[ortho-phenylbenzyl (meth)acrylate]+[meta-phenylbenzyl (meth)acrylate]}/[para-phenylbenzyl (meth)acrylate]] is 55/45 to 10/90 in order to provide a composition that has a low viscosity and that forms a cured product having a sufficiently high refractive index.

Furthermore, among these compounds, ortho-phenylbenzyl (meth)acrylate and para-phenylbenzyl (meth)acrylate are preferably used in combination because they are relatively easily manufactured. In this case, the mixing ratio is preferably set in such a manner that the molar ratio of ortho-phenylbenzyl (meth)acrylate to para-phenylbenzyl (meth)acrylate [[ortho-phenylbenzyl (meth)acrylate]/[para-phenylbenzyl (meth)acrylate]] is 55/45 to 10/90 in order to provide a composition that has a low viscosity and that forms a cured product having a sufficiently high refractive index.

The phenylbenzyl (meth)acrylate (A) is produced by, for example, a method in which biphenyl methanol and (meth)acrylic acid are esterified or a method in which a halogenated methylbiphenyl such as chloromethylbiphenyl or bromomethylbiphenyl is caused to react with a salt of (meth)acrylic acid and an alkali metal such as potassium, sodium, or lithium.

In the radically polymerizable composition according to the present invention, the content of the phenylbenzyl (meth)acrylate (A) is preferably 10 to 95 parts by mass relative to 100 parts by mass of the nonvolatile content of the radically polymerizable composition in order to form a cured product having a high refractive index. The content of the phenylbenzyl (meth)acrylate (A) is more preferably 30 to 85 parts by mass in order to provide a radically polymerizable composition that forms a cured product having good releasability. The content of the phenylbenzyl (meth)acrylate (A) is preferably 45 to 80 parts by mass and more preferably 50 to 75 in order to provide a radically polymerizable composition having a lower viscosity.

Since the bis[(meth)acryloylmethyl]biphenyl (B) included in the radically polymerizable composition according to the present invention has an aromatic ring in its molecular structure, a cured coating film having a high refractive index can be produced by adding the bis[(meth)acryloylmethyl]biphenyl (B). In addition, since the bis[(meth)acryloylmethyl]biphenyl (B) has two (meth)acryloyl groups in its molecular structure, good curability is exhibited through radical polymerization. This contributes to an effect of improving the toughness of the resulting coating film.

Examples of the bis[(meth)acryloylmethyl]biphenyl (B) include 2,2'-bis[(meth)acryloylmethyl]-1,1'-biphenyl, 3,3'-bis[(meth)acryloylmethyl]-1,1'-biphenyl, 4,4'-bis[(meth)acryloylmethyl]-1,1'-biphenyl, 2,4'-bis[(meth)acryloylmethyl]-1,1'-biphenyl, 2,4-bis[(meth)acryloylmethyl]-1,1'-biphenyl, and 2,6-bis[(meth)acryloylmethyl]-1,1'-biphenyl. These compounds may be used alone or in combination of two or more. Among these compounds, from the viewpoint of ease of manufacture, 2,2'-bis[(meth)acryloylmethyl]-1,1'-biphenyl, 3,3'-bis[(meth)acryloylmethyl]-1,1'-biphenyl, and 4,4'-bis[(meth)acryloylmethyl]-1,1'-biphenyl are preferable, and 4,4'-bis[(meth)acryloylmethyl]-1,1'-biphenyl is more preferable.

The bis[(meth)acryloylmethyl]biphenyl (B) is produced by, for example, a method in which biphenyldimethanol and (meth)acrylic acid are esterified or a method in which a bis(halogenated methyl)biphenyl such as bis(chloromethyl)biphenyl or bis(bromomethyl)biphenyl is caused to react with (meth)acrylic acid.

In the radically polymerizable composition according to the present invention, the content of the bis[(meth)acryloylmethyl]biphenyl (B) is preferably 5 to 70 parts by mass relative to 100 parts by mass of the nonvolatile content of the radically polymerizable composition in order to form a cured product having a high refractive index and high toughness. The content of the bis[(meth)acryloylmethyl]biphenyl (B) is more preferably 10 to 50 parts by mass in order to provide a radically polymerizable composition that forms a cured product having higher heat resistance. The content of the bis[(meth)acryloylmethyl]biphenyl (B) is preferably 15 to 30 parts by mass in order to provide a radically polymerizable composition having a lower viscosity.

Since the biphenyl compound (C) having a molecular structure in which biphenyl structures are bonded to each other through a methylene used in the present invention has an aromatic ring in its molecular structure, a cured coating film having a high refractive index can be produced by adding the biphenyl compound (C).

In the biphenyl compound (C) having a molecular structure in which biphenyl structures are bonded to each other through a methylene, the number of biphenyl structure units in its molecular structure is preferably 2 to 5 in order to achieve high solubility in the other components included in the radically polymerizable composition according to the present invention.

The biphenyl compound (C) having a molecular structure in which biphenyl structures are bonded to each other through a methylene is produced by, for example, a method in which biphenyl is caused to react with p-formaldehyde in the presence of an acid catalyst.

In the radically polymerizable composition according to the present invention, the content of the biphenyl compound (C) having a molecular structure in which biphenyl structures are bonded to each other through a methylene is preferably 0.5 to 15 parts by mass and more preferably 1 to 10 parts by mass relative to 100 parts by mass of the nonvolatile content of the radically polymerizable composition in order to form a cured product having a high refractive index.

In particular, the radically polymerizable composition according to the present invention, which includes the bis [(meth)acryloylmethyl]biphenyl (B) or the biphenyl compound (C) having a molecular structure in which biphenyl structures are bonded to each other through a methylene, preferably includes both the bis[(meth)acryloylmethyl]biphenyl (B) and the biphenyl compound (C) having a molecular structure in which biphenyl structures are bonded to each other through a methylene in order to provide a resin composition having a low viscosity and a high refractive index.

In the present invention, the content of the phenylbenzyl (meth)acrylate (A) is preferably 30 to 95 parts by mass relative to 100 parts by mass in total of the phenylbenzyl (meth) acrylate (A), the bis[(meth)acryloylmethyl]biphenyl (B), and the biphenyl compound (C) having a molecular structure in which biphenyl structures are bonded to each other through a methylene in order to provide a radically polymerizable composition that forms a cured product having a high refractive index. The content of the phenylbenzyl (meth)acrylate (A) is more preferably 35 to 90 parts by mass in order to provide a radically polymerizable composition that forms a cured product having good releasability. In order to provide a radically polymerizable composition having a lower viscosity, the content of the phenylbenzyl (meth)acrylate (A) is preferably 45 to 85 parts by mass and more preferably 55 to 80.

In the present invention, the content of the bis[(meth)acryloylmethyl]biphenyl (B) is preferably 5 to 70 parts by mass relative to 100 parts by mass in total of the phenylbenzyl (meth)acrylate (A), the bis[(meth)acryloylmethyl]biphenyl (B), and the biphenyl compound (C) having a molecular structure in which biphenyl structures are bonded to each other through a methylene in order to provide a radically polymerizable composition that forms a cured product having a high refractive index. The content of the bis[(meth)acryloylmethyl]biphenyl (B) is preferably 10 to 60 parts by mass in order to provide a radically polymerizable composition that forms a cured product having higher heat resistance. The content of the bis[(meth)acryloylmethyl]biphenyl (B) is preferably 15 to 55 parts by mass in order to provide a radically polymerizable composition having a lower viscosity.

In the present invention, the content of the biphenyl compound (C) having a molecular structure in which biphenyl structures are bonded to each other through a methylene is preferably 0.5 to 15 parts by mass and more preferably 1 to 10 parts by mass relative to 100 parts by mass in total of the phenylbenzyl (meth)acrylate (A), the bis[(meth)acryloylmethyl]biphenyl (B), and the biphenyl compound (C) having a molecular structure in which biphenyl structures are bonded to each other through a methylene in order to provide a radically polymerizable composition that forms a cured product having a high refractive index.

In the radically polymerizable composition according to the present invention, the total mass of the phenylbenzyl (meth)acrylate (A), the bis[(meth)acryloylmethyl]biphenyl (B), and the biphenyl compound (C) having a molecular structure in which biphenyl structures are bonded to each other through a methylene is preferably 15 to 100 parts by mass, more preferably 25 to 95 parts by mass, and further preferably 35 to 80 parts by mass relative to 100 parts by mass of the nonvolatile content of the radically polymerizable composition in order to provide a radically polymerizable composition having a high refractive index and a low viscosity.

In the case where the radically polymerizable composition according to the present invention includes the phenylbenzyl (meth)acrylate (A), the bis(acryloylmethyl)biphenyl (B), and the biphenyl compound (C) having a molecular structure in which biphenyl structures are bonded to each other through a methylene, these compounds may be simultaneously produced by a single reaction. Such a radically polymerizable composition is, for example, a radically polymerizable composition produced by reacting biphenyl, a hydrogen halide, and a formaldehyde derivative with one another to prepare a reaction mixture and further reacting the reaction mixture with acrylic acid or an alkali metal acrylate.

This radically polymerizable composition may include, as a by-product of the reaction, a compound other than the phenylbenzyl (meth)acrylate (A), the bis[(meth)acryloylmethyl]biphenyl (B), or the biphenyl compound (C) having a molecular structure in which biphenyl structures are bonded to each other through a methylene. In this case, the total mass of the phenylbenzyl (meth)acrylate (A), the bis[(meth)acryloylmethyl]biphenyl (B), and the biphenyl compound (C) having a molecular structure in which biphenyl structures are bonded to each other through a methylene is preferably 50 to 95 parts by mass and more preferably 65 to 80 parts by mass relative to 100 parts by mass of the composition in order to provide a radically polymerizable composition having a higher hardness and a lower viscosity.

A specific example of the method for simultaneously producing a radical resin composition including the phenylbenzyl (meth)acrylate (A), the bis(acryloylmethyl)biphenyl (B), and the biphenyl compound (C) having a molecular structure in which biphenyl structures are bonded to each other through a methylene by a single reaction is as follows. Biphenyl, a hydrogen halide, and a formaldehyde derivative are caused to react with one another in the presence of an acid catalyst to prepare a mixture including the biphenyl compound (C) having a molecular structure in which biphenyl structures are bonded to each other through a methylene, biphenyl, a methylchloro compound of biphenyl. Then, the methylchloro compound of biphenyl included in the mixture is caused to react with acrylic acid or an alkali metal acrylate to prepare a mixture including the phenylbenzyl (meth)acrylate (A) and the bis[(meth)acryloylmethyl]biphenyl (B).

In the case where the phenylbenzyl (meth)acrylate (A), the bis(acryloylmethyl)biphenyl (B), and the biphenyl compound (C) having a molecular structure in which biphenyl structures are bonded to each other through a methylene are produced by the method described above, the content ratio of the phenylbenzyl (meth)acrylate (A), the bis[(meth)acryloylmethyl]biphenyl (B), and the biphenyl compound (C) having a molecular structure in which biphenyl structures are bonded to each other through a methylene can be controlled as needed by changing the amount of the formaldehyde derivative used in the reaction or by changing the types or amounts of the acid catalyst and an organic acid. Specifically, the amount of formaldehyde used is preferably 1 to 25 moles and more preferably 1.5 to 5 moles relative to 1 mole of biphenyl in order to easily control the content ratio to be within the preferred range described above. Examples of the formaldehyde derivative include formalin, para-formaldehyde, and trioxane. The molar ratio of the hydrogen halide used relative to biphenyl is preferably excessively high. Examples of the hydrogen halide include concentrated hydrochloric acid and hydrogen chloride gas. Examples of the acid catalyst used in the reaction include sulphuric acid, phosphoric acid, polyphosphoric acid, trichloroacetic acid, dichloroacetic acid, monochloroacetic acid, methanesulfonic acid, p-toluenesulfonic acid, and Lewis acids such as zinc chloride. In the reaction, an organic solvent such as dimethoxyethane, dioxane, cyclopentyl methyl ether, or acetic acid may be used. The reaction temperature is preferably 60° C. to 180° C. and more preferably 70° C. to 120° C. The reaction time is preferably 3 to 60 hours and more preferably 15 to 45 hours.

In the case where the phenylbenzyl (meth)acrylate (A), the bis(acryloylmethyl)biphenyl (B), and the biphenyl compound (C) having a molecular structure in which biphenyl structures are bonded to each other through a methylene are produced by the method described above, biphenyl may remain in the composition as an unreacted raw material. In this case, in the radically polymerizable composition according to the present invention, the content of biphenyl is preferably 0.5 to 15 parts by mass and more preferably 1 to 10 parts by mass relative to 100 parts by mass of the nonvolatile content of the radically polymerizable composition in order to provide a composition having a high refractive index and a low viscosity, which are the intended effects of the present invention.

The content of each component contained in the radically polymerizable composition produced by the method described above is measured by, for example, capillary gas chromatography, liquid chromatography, or gel permeation chromatography. Specifically, the chromatography may be performed using a capillary column such as "HP-1" produced by Agilent Technologies, Inc. (liquid phase: 100% dimethylpolysiloxane) by increasing the temperature from 50° C. to 325° C. The degree of polymerization of the biphenyl compound (C) contained in the product is determined by, for example, the following method. Silica gel column chromatography is performed to remove the phenylbenzyl (meth)acrylate (A) and the bis(acryloylmethyl)biphenyl (B). The remaining components are analyzed using a gas-chromatograph-mass spectrometer (GC-MS) or a high-performance liquid-chromatograph-mass spectrometer (LC-MS).

In addition to the phenylbenzyl (meth)acrylate (A), the bis[(meth)acryloylmethyl]biphenyl (B), and the biphenyl compound (C), the radically polymerizable composition according to the present invention may include a (meth)acrylate compound (Y) having a fluorene skeleton in its molecular structure in combination. The (meth)acrylate compound (Y) having a fluorene skeleton in its molecular structure has a high refractive index, but on the other hand, it has a considerably high viscosity or is solid at ordinary temperature. For example, the compound represented by general formula (1) below has a refractive index of 1.617 at 40° C. and is solid at ordinary temperature.

[Chem. 1]

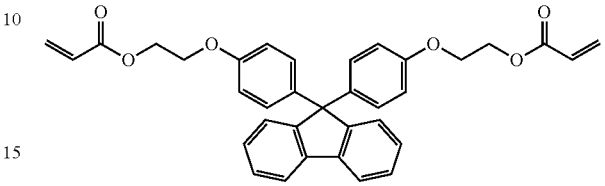

(1)

A composition including the phenylbenzyl (meth)acrylate (A), the bis[(meth)acryloylmethyl]biphenyl (B) or the biphenyl compound (C) having a molecular structure in which biphenyl structures are bonded to each other through a methylene, which are included in the radically polymerizable composition according to the present invention as essential components, has a low viscosity and a high refractive index as described above. Therefore, when these compounds are used in combination with the (meth)acrylate compound (Y) having a fluorene skeleton in its molecular structure, a radically polymerizable synthetic composition having a low viscosity can be produced while taking advantage of the high refractive index of the (meth)acrylate compound (Y) having a fluorene skeleton in its molecular structure.

An example of the (meth)acrylate compound (Y) having a fluorene skeleton in its molecular structure used in the present invention is a compound having a fluorene skeleton or a diphenylfluorene skeleton; and at least one (meth)acryloyl group. The number of the fluorene skeletons or the diphenylfluorene skeletons in the molecular structure may be one or two or more.

Specific examples of the (meth)acrylate compound (Y) having a fluorene skeleton in its molecular structure used in the present invention include compounds represented by general formulae (2) to (7) below.

[Chem. 2]

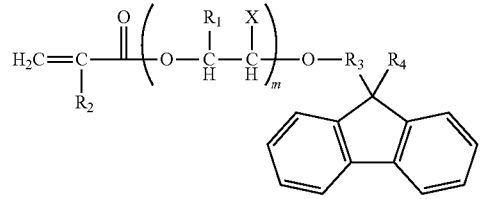

(2)

[In general formula (2), X is a hydrogen atom or a hydroxyl group; R1 and R4 are independently a hydrogen atom or an alkyl group having a carbon number of 1 to 3; R2 is a hydrogen atom or a methyl group; R3 is a direct bond or a methylene group; and m is an integer of 0 to 5.]

[Chem. 3]

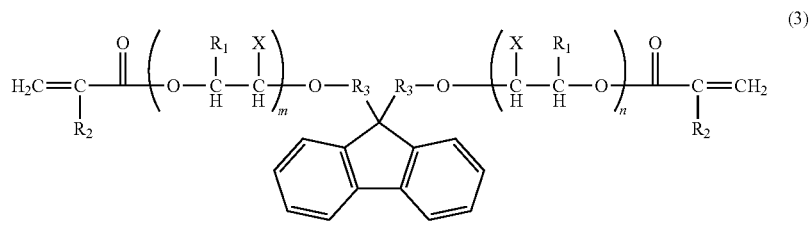

(3)

[In general formula (3), two X's are independently a hydrogen atom or a hydroxyl group; two R1's are independently a hydrogen atom or an alkyl group having a carbon number of 1 to 3; two R2's are independently a hydrogen atom or a methyl group; two R3's are independently a direct bond or a methylene group; and m and n are independently an integer of 0 to 5.]

[Chem. 4]

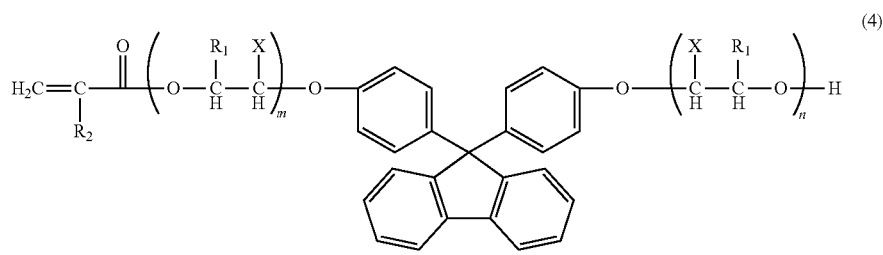

(4)

[In general formula (4), two X's are independently a hydrogen atom or a hydroxyl group; two R1's are independently a hydrogen atom or an alkyl group having a carbon number of 1 to 3; R2 is a hydrogen atom or a methyl group; and m and n are independently an integer of 0 to 5.]

[Chem. 5]

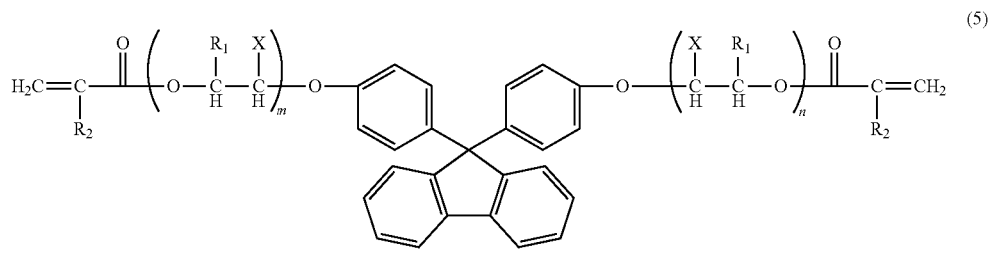

(5)

[In general formula (5), two X's are independently a hydrogen atom or a hydroxyl group; two R1's are independently a hydrogen atom or an alkyl group having a carbon number of 1 to 3; two R2's are independently a hydrogen atom or a methyl group; and m and n are independently an integer of 0 to 5.]

[Chem. 6]

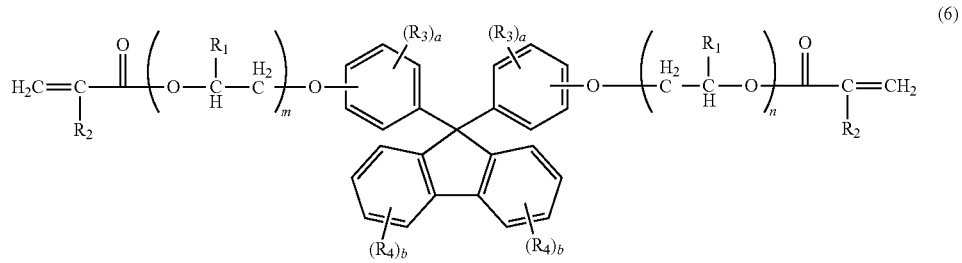

(6)

[In general formula (6), two R1's are independently a hydrogen atom or an alkyl group having a carbon number of 1 to 3; two R2's are independently a hydrogen atom or a methyl group; two R3's are independently a hydrocarbon group having an carbon number of 1 to 6; two R4's are independently a cyano group, a halogen atom, or an alkyl group having a carbon number of 1 to 3; two a's are independently an integer of 1 to 4; two b's are independently an integer of 0 to 4; and m and n are independently an integer of 0 to 5.]

[Chem. 7]

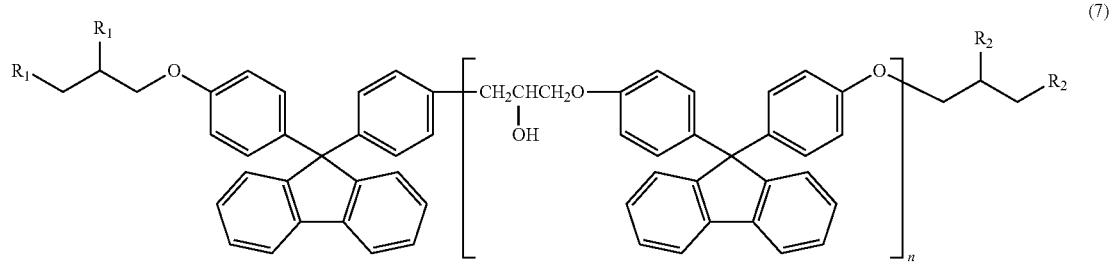

(7)

[In general formula (7), one of two R1's is a hydroxyl group, and the other is an oxy(meth)acryloyl group; and one of two R1's is a hydroxyl group, and the other is an oxy(meth)acryloyl group.]

The (meth)acrylate compound (Y) having a fluorene skeleton in its molecular structure may be used alone or in combination of two or more. In particular, a (meth)acrylate compound having a diphenylfluorene skeleton in its molecular structure, such as a compound represented by any one of general formulae (4) to (7), is preferable in order to provide a radically polymerizable composition having a higher refractive index. In order to provide a radically polymerizable composition having a lower viscosity, a (meth)acrylate compound having one diphenylfluorene skeleton in its molecular structure, such as a compound represented by any one of general formulae (4) to (6) is more preferable, and a compound represented by general formula (5) is particularly preferable.

In the case where the radically polymerizable composition according to the present invention includes the (meth)acrylate compound (Y) having a fluorene skeleton, the content of the (meth)acrylate compound (Y) having a fluorene skeleton is preferably 15 to 80 parts by mass and more preferably 25 to 70 parts by mass relative to 100 parts by mass of the nonvolatile content of the radically polymerizable composition in order to provide a composition having a higher refractive index and a lower viscosity.

In addition to the phenylbenzyl (meth)acrylate (A), the bis[(meth)acryloylmethyl]biphenyl (B), and the biphenyl compound (C), the radically polymerizable composition according to the present invention may include, in combination, a (meth)acrylate compound (Z) other than the phenylbenzyl (meth)acrylate (A), the bis[(meth)acryloylmethyl]biphenyl (B), or the (meth)acrylate compound (Y) having a fluorene skeleton.

Examples of the (meth)acrylate compound (Z) include monofunctional (meth)acrylate compounds such as n-butyl (meth)acrylate, isobutyl (meth)acrylate, tert-butyl (meth)acrylate, n-pentyl (meth)acrylate, n-hexyl (meth)acrylate, n-octyl (meth)acrylate, isooctyl (meth)acrylate, 2-ethylhexyl (meth)acrylate, benzyl (meth)acrylate, phenoxyethyl (meth)acrylate, phenoxydiethylene glycol (meth)acrylate, glycidyl (meth)acrylate, morpholine (meth)acrylate, 2-hydroxyethyl (meth)acrylate, 2-hydroxypropyl (meth)acrylate, 4-hydroxybutyl (meth)acrylate, diethylene glycol mono(meth)acrylate, triethylene glycol mono(meth)acrylate, dipropylene glycol mono(meth)acrylate, 2-methoxyethyl (meth)acrylate, methoxydiethylene glycol (meth)acrylate, methoxytriethylene glycol (meth)acrylate, methoxypolyethylene glycol (meth)acrylate, 2-butoxyethyl (meth)acrylate, butoxytriethylene glycol (meth)acrylate, 2-ethoxyethyl (meth)acrylate, 2-(2-ethoxyethoxy)ethyl (meth)acrylate, ethoxypolyethylene glycol (meth)acrylate, 4-nonylphenoxyethylene glycol (meth)acrylate, tetrahydrofurfuryl (meth)acrylate, caprolactone-modified tetrahydrofurfuryl (meth)acrylate, cyclohexyl (meth)acrylate, isobornyl (meth)acrylate, 2-hydroxy-3-phenoxypropyl (meth)acrylate, cyclohexyl (meth)acrylate, cyclohexylmethyl (meth)acrylate, cyclohexylethyl (meth)acrylate, dicyclopentanyl (meth)acrylate, dicyclopentanyloxyethyl (meth)acrylate, dicyclopentenyl (meth)acrylate, dicyclopentenyloxyethyl (meth)acrylate, and phenylphenoxyethyl acrylate;

di(meth)acrylate compounds such as ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, butylene glycol di(meth)acrylate, tetrabutylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, di(meth)acrylate of an ethylene oxide adduct of bisphenol A, di(meth)acrylate of a propylene oxide adduct of bisphenol A, di(meth)acrylate of an ethylene oxide adduct of bisphenol F, di(meth)acrylate of a propylene oxide adduct of bisphenol F, dicyclopentanyl di(meth)acrylate, glycerol di(meth)acrylate, neopentyl glycol hydroxypivalic acid ester di(meth)acrylate, caprolactone-modified hydroxypivalic acid neopentyl glycol di(meth)acrylate, tetrabromobisphenol A di(meth)acrylate, hydroxypivalaldehyde-modified trimethylolpropane di(meth)acrylate, and 1,4-cyclohexanedimethanol di(meth)acrylate; and trifunctional or higher functional (meth)acrylate compounds such as trimethylolpropane tri(meth)acrylate, tri(meth)acrylate of an ethylene oxide adduct of trimethylolpropane, tri(meth)acrylate of a propylene oxide adduct of trimethylolpropane, pentaerythritol tri(meth)acrylate, glycerol tri(meth)acrylate, tri(meth)acrylate of an alkyl-modified dipentaerythritol, ditrimethylolpropane tetra(meth)acrylate, tetra(meth)acrylate of an ethylene oxide adduct of ditrimethylolpropane, tetra(meth)acrylate of a propylene oxide adduct of ditrimethylolpropane, penta(meth)acrylate of dipentaerythritol, and hexa(meth)acrylate of dipentaerythritol. These compounds may be used alone or in combination of two or more.

In particular, benzyl (meth)acrylate, phenoxyethyl (meth)acrylate, phenylphenoxyethyl acrylate, di(meth)acrylate of an ethylene oxide adduct of bisphenol A, and di(meth)acrylate of a propylene oxide adduct of bisphenol A are preferable in order to provide a radically polymerizable composition having a higher refractive index.

In the case where the radically polymerizable composition according to the present invention includes the (meth)acrylate compound (Z), the total mass of the phenylbenzyl (meth)acrylate (A), the bis[(meth)acryloylmethyl]biphenyl (B), and the biphenyl compound (C) is preferably 25 to 95 parts by mass and more preferably 35 to 80 parts by mass relative to 100 parts by mass of the nonvolatile content of the radically polymerizable composition in order to provide a composition having a high refractive index and a low viscosity, which are the intended effects of the present invention.

In the case where the composition according to the present invention is cured by being irradiated with an ultraviolet ray, it is preferable to use a photopolymerization initiator. Examples of the photopolymerization initiator include 1-hydroxycyclohexyl phenyl ketone, 2-hydroxy-2-methylpropiophenone, and 2,4,6-trimethylbenzoyldiphenylphosphine oxide. These compounds may be used alone or in combination of two or more.

In addition to the above-described components, the composition according to the present invention may include, in combination, a mold release agent, an antifoaming agent, a leveling agent, an ultraviolet absorber, a light stabilizer (e.g., hindered amine), an antioxidant, a polymerization inhibitor, an antistatic agent, a colorant (e.g., dye and pigment), an inorganic filler, and an organic filler.

The composition according to the present invention is cured by, for example, the following method. The composition is applied onto a substrate or formed into shape depending on its intended purpose and use, and subsequently irradiated with an active energy ray or heated.

In the case where the composition is cured by being irradiated with an active energy ray, such an active energy ray is, for example, an electron beam, an ultraviolet ray, or visible light. In the case where an electron beam is used as the active energy ray, the curable composition according to the present invention may be cured using, for example, a Cockcroft-Walton accelerator, a Van de Graaff electron accelerator, a resonant transformer accelerator, or an electron beam generator of an insulated-core-transformer type, a Dynamitron type, a linear-filament type, or a high-frequency type. In the case where an ultraviolet ray is used as the active energy ray, the composition may be cured by being irradiated using a mercury lamp such as an ultrahigh-pressure mercury lamp, a high-pressure mercury lamp, or a low-pressure mercury lamp, a xenon lamp, carbon arc, a metal height lamp, a high-power LED-UV lamp, or the like. In this case, the amount of ultraviolet ray exposure is preferably 0.1 to 1000 mJ/cm$^2$.

When the composition is cured by being heated, it can be cured by being heated in the temperature range of 60° C. to 250° C.

The refractive index of a cured product formed of the radically curable resin composition according to the present invention is preferably 1.610 or more, more preferably 1.620 or more, and further preferably 1.630 or more. When the refractive index is less than 1.610, such a refractive index is insufficient for use in optical materials.

[Applications]

The radically polymerizable composition according to the present invention described above in detail can be suitably used for plastic lenses such as an eyeglass lens, a digital camera lens, a Fresnel lens, and a prism lens; and various optical materials such as an optical over-coating agent, a hard coating agent, an antireflection film, an optical fiber, an optical waveguide, a hologram, a prism lens, an LED seal material, and a solar-battery coating material.

Among these applications, in particular, the radically polymerizable composition can be suitably used for plastic lens and particularly useful as a prism lens for liquid crystal substrates because the radically polymerizable composition forms a cured product having a high refractive index, high heat resistance, and high moisture resistance.

The prism lens for liquid crystal substrates is a sheet-shaped lens that includes a plurality of fine prismatic portions formed on one surface of a sheet-shaped molded body. Ordinary, the sheet-shaped lens is disposed on a back surface (light-source side) of a liquid crystal display element so that the prism plane faces the liquid crystal display element. Furthermore, a light-guiding sheet is disposed on the back surface of the sheet-shaped lens, or the prism lens also functions as the light-guiding sheet.

Regarding the shape of the prismatic portions of the prism lens, the prism apex angle θ is preferably 70° to 110°, more preferably 75° to 100°, and particularly preferably 80° to 95° in order to achieve good light-condensing property and to improve luminance.

The pitch of the prism is preferably 100 μm or less and particularly preferably 70 μm or less to prevent the formation of a moiré pattern on a screen and to further improve the definition of the screen. The difference between the depressions and projections of the prismatic portions is determined depending on the prism apex angle θ and the pitch of the prismatic portions, and is preferably 50 μm or less. The sheet thickness of the prism lens is preferably as large as possible from the viewpoint of strength, but is preferably as small as possible from an optical viewpoint in order to reduce the absorption of light. In order to achieve a good balance, the sheet thickness is preferably 50 to 1000 μm.

The prism lens is produced from the composition according to the present invention by, for example, the following method. The composition is applied to a forming die such as a metal die or resin die having a prism pattern formed therein. The surface of the composition is smoothed and then a transparent substrate is superposed thereonto. The composition is cured by being irradiated with an active energy ray.

The transparent substrate is not particularly limited as long as it has high transparency and preferably has a thickness of 3 mm or less in views of active-energy ray permeability, ease of handling, etc. Examples of material of the transparent substrate include synthesis resins such as an acrylic resin, a polycarbonate resin, a polyester resin, a polystyrene resin, a fluorine resin, a polyimide resin, and a mixture of these polymers; and glass.

The prism sheet formed on the transparent substrate by the above-described method may be directly used or may be used as prismatic portions alone after the transparent substrate is removed. When the prism sheet is used without removing the transparent substrate from the prismatic portions, an adhesiveness-improving treatment such as a primer treatment is preferably performed on the surface of the transparent substrate since it is important to improve the adhesiveness between the prism lens and the transparent substrate from the viewpoints of weather resistance and durability.

In the case where the transparent substrate is removed, a surface treatment with a silicone-based or fluorine-based release agent is preferably performed on the surface of the transparent substrate because it is preferable to relatively easily remove the transparent substrate.

EXAMPLES

Hereinafter, the embodiment of the present invention will be described in further detail, which does not limit the present invention. Note that units are based on mass unless otherwise indicated.

In the present invention, the viscosity was measured at 25° C. using an E-type rotational viscometer ("RE80U" produced by Toki Sangyo Co., Ltd).

In the present invention, the refractive index was measured using an Abbe refractometer ("NAR-3T" produced by ATAGO CO., LTD). The measurement was generally performed at 25° C. An object that was solid at 25° C. was measured by setting an appropriate temperature.

In the present invention, the measurement of $^1$H-NMR was performed with NMR "GSX270" produced by JEOL Ltd. at 300 MHz using a deuterochloroform solvent.

In the present invention, the gas chromatography-mass spectrum was measured with a gas chromatograph-mass spectrometer (GC-MS) ("GC-2010" produced by SHIMADZU CORPORATION, column: "Zebron ZB-5" produced by SHIMADZU CORPORATION) under the following conditions: He carrier gas, flow rate 1.47 mL/min, column oven 50° C., vaporizing chamber 300° C., and temperature rise 50° C. to 300° C. (25° C./min).

In the present invention, high-performance liquid chromatography (LC) was performed with a high-performance liquid chromatograph ("2695" produced by Waters, column: "L-Column2 ODS" produced by Chemical Evaluation and Research Institute) under the following conditions: detection UV 240 nm, temperature 40° C., flow rate 1 mL/min, and acetonitrile/water=70/30 to 100/0.

In the present invention, gas chromatography (GC) was performed with a gas chromatograph ("6850 Series" produced by Agilent Technologies, column: "Agilent DB-1" produced by Agilent Technologies) under the following conditions: He carrier gas, flow rate 1 mL/min, injection temperature 300° C., detection temperature 300° C., and temperature rise 50° C. to 325° C. (25° C./min).

Production Example 1

Synthesis of Ortho-Phenylbenzyl Acrylate

Into a 200-mL three-necked flask equipped with a stirrer, a thermometer, a cooling tube, and a calcium chloride tube, 20.0 g of ortho-phenylbenzyl alcohol, 100.0 g of anhydrous toluene, 13.2 g of triethylamine, and 7.8 mg of methoquinone were charged, and the mixture was cooled to 10° C. or less using an ice bath. Into the flask, 11.8 g of acryloyl chloride was added dropwise over 30 minutes. The temperature was increased to room temperature, and a reaction was conducted for two hours. After the completion of the reaction, the reaction solution was poured into water and washed with a 5% NaOH aqueous solution and a saline solution. The solvent was distilled off to prepare an orange liquid. The orange liquid was purified using a silica gel column to prepare 20.44 g of ortho-phenylbenzyl acrylate. The ortho-phenylbenzyl acrylate was a colorless, transparent liquid at ordinary temperature and had a refractive index of 1.5776 and a viscosity of 27 mPa·s at 25° C. The measurement results of $^1$H-NMR are shown below.

$^1$H-NMR (CDCl$_2$, 300 MHz): 7.53-7.49 (m, 1H of Ph), 7.48-7.28 (m, 8H of Ph), 6.41-6.34 (q, 1H of CH=CH), 6.34-6.07 (q, 1H of CH=CH), 5.82-5.77 (q, 1H of CH=CH), 5.13 (s, 2H of CH$_2$-Ph).

Production Example 2

Synthesis of Meta-Phenylbenzyl Acrylate

Into a 200-mL four-necked flask equipped with a stirrer, a thermometer, and a cooling tube, 20.0 g of 3-(bromomethyl)biphenyl, 39.3 g of anhydrous dimethylformamide, 13.4 g of anhydrous potassium carbonate, and 6.2 mg of methoquinone were charged. Then, acrylic acid was added into the flask at room temperature. After the formation of carbonic acid gas bubbles was completed, the reaction temperature was increased to 90° C., and a reaction was conducted for two hours. The temperature was reduced to room temperature, and subsequently dilution with 120 mL of water, extraction with 100 g of toluene, and washing with water were performed. The resulting crude reaction product was purified using a silica gel column to prepare 16.1 g of meta-phenylbenzyl acrylate. The meta-phenylbenzyl acrylate was a colorless, transparent liquid at ordinary temperature and had a refractive index of 1.5888 and a viscosity of 24 mPa·s at 25° C. The measurement results of $^1$H-NMR are shown below.

$^1$H-NMR (CDCl$_2$, 300 MHz): 7.60-7.32 (m, 9H of Ph), 6.50-6.42 (q, 1H of CH=CH), 6.22-6.12 (q, 1H of CH=CH), 5.87-5.82 (q, 1H of CH=CH), 5.26 (s, 2H of CH$_2$-Ph).

Production Example 3

Synthesis of Para-Phenylbenzyl Acrylate

The same process as in Synthesis Example 1 was conducted except that para-phenylbenzyl alcohol was used instead of the ortho-phenylbenzyl alcohol used in Synthesis Example 1, and consequently 22.4 g of para-phenylbenzyl acrylate was prepared. The para-phenylbenzyl acrylate was solid at ordinary temperature and had a melting point of 32°

C. and a refractive index of 1.5920 at 40° C. The measurement results of $^1$H-NMR are shown below.

$^1$H-NMR (CDCl$_2$, 300 MHz): 7.62-7.32 (m, 9H of Ph), 6.50-6.43 (q, 1H of CH=CH), 6.23-6.12 (q, 1H of CH=CH), 5.88-5.84 (q, 1H of CH=CH), 5.27 (s, 2H of CH$_2$-Ph).

Production Example 4

Synthesis of 4,4'-bis(acryloylmethyl)biphenyl

Into a 200-mL four-necked flask equipped with a stirrer, a thermometer, and a cooling tube, 18.0 g of 4,4'-chloromethylbiphenyl, 100 mL of anhydrous dimethylformamide, 25.0 g of anhydrous potassium carbonate, and 100 mg of methoquinone were charged. The reaction temperature was increased to 120° C. with air bubbling, and a reaction was conducted for 15 minutes. The temperature was reduced to 50° C., and subsequently the reaction liquid was poured into 300 mL of distilled water. The precipitated crystal was filtered and dried. The resultant is then subjected to recrystallization from 80 mL of ethanol to prepare 14.5 g of 4,4'-bis(acryloylmethyl)biphenyl. The 4,4'-bis(acryloylmethyl)biphenyl was a crystal having a melting point of 61° C. to 62° C. and had a refractive index of 1.5648 at 70° C. The measurement results of $^1$H-NMR and mass spectrum are shown below.

$^1$H-NMR (CDCl$_2$, 300 MHz): 7.67-7.46 (m, 4H of Ph), 7.44-7.28 (m, 4H of Ph), 6.50-6.43 (q, 2H of CH=CH), 6.23-6.12 (q, 2H of CH=CH), 5.88-5.84 (q, 2H of CH=CH), 5.27 (s, 4H of CH$_2$-Ph).

GC-MS: [M+H]$^+$=323

Production Example 5

Synthesis of Biphenyl Compound

Into a 5-L four-necked flask equipped with a stirrer, a cooling tube, and a thermometer, 709 g of diphenyl, 276 g of para-formaldehyde, 1381 g of acetic acid, 958 g of concentrated hydrochloric acid, and 117 g of iron trichloride were charged, and the mixture was heated to 80° C. After the temperature of the charged solution was confirmed to be 80° C., a reaction was conducted for 15 hours. A solid was precipitated during the reaction. After the completion of the reaction, the reaction liquid was filtered at 60° C. to collect the precipitated solid. This solid was washed with 500 mL of methanol and dried to prepare 90 g of biphenyl compound in the form of a solid. As a result of a measurement by liquid chromatography, it was confirmed that biphenyl compounds in which the number of the biphenyl structure units included in its molecular structure were 2, 3, and 4 were included. The contents of these compounds were as follows.

biphenyl compound (two structural units): 99.24% (retention time: 15.73 to 17.08 min), biphenyl compound (three structural units): 0.54% (retention time: 19.93 to 20.55 min), biphenyl compound (four structural units): 0.22% (retention time: 21.99 to 22.23 min)

Production Example 6

Production of mixture (1) of phenylbenzyl methacrylate (A), bis(acryloylmethyl)biphenyl (B), biphenyl, and biphenyl compound (C) having a molecular structure in which biphenyl structures are bonded to each other through a methylene Synthesis of Chloro Intermediate Into a 5-L four-necked flask equipped with a stirrer, a cooling tube, a thermometer, and a hydrogen chloride gas inlet unit, 709 g of diphenyl, 276 g of para-formaldehyde, 1381 g of acetic acid, and 958 g of concentrated hydrochloric acid were charged, and the mixture was heated to 80° C. After the temperature of the charged solution was confirmed to be 80° C., hydrogen chloride gas was introduced into the charged solution at a rate of 20 g/hr using a Kinoshita glass ball filter. After it was confirmed that the dissolution of the hydrogen chloride gas in the charged solution was saturated, 1061 g of phosphoric acid was added dropwise over 1 hour. A reaction was conducted for 30 hours. Immediately after the completion of the reaction, a lower layer was removed from the reaction solution, and 2.3 kg of toluene was added into an organic layer. The organic layer was then washed with 400 g of a 12.5% aqueous sodium hydroxide solution, a saturated aqueous sodium hydrogen carbonate solution, and distilled water. The organic layer was distilled off to prepare 908 g of a chloro intermediate in the form of a white solid.

Acryloylation

Nine hundred and eight grams of the intermediate prepared above was dissolved in 1603 g of DMF serving as a reaction solvent. Thereinto, 372 g of potassium carbonate was added, and methoquinone was added in a concentration of 300 ppm with respect to the total amount. The intermediate solution was heated to 40° C., and subsequently 323 g of acrylic acid was added dropwise into the intermediate solution over 1.5 hours. After the completion of dropping, the temperature was increased to 80° C. over 2 hours, and stirring was performed for 3 hours under heating at 80° C. Into the resulting solution, 3.4 kg of water and 1.8 kg of toluene were added, and extraction was performed. Then, an organic layer was washed until an aqueous layer was neutralized. The organic layer was concentrated to prepare 995 g of a liquid sample. The resulting sample was stored at 0° C. for 2 days. No precipitation of a crystal was observed.

Analysis of Sample

The resulting sample had a refractive index of 1.592 and a viscosity of 30 mPa·s in the form of a liquid at 25° C. The content of each component included in 100 parts of the sample was determined by gas chromatography. The content of phenylbenzyl acrylate (A) was 65.2 parts by mass. The content of bis(acryloylmethyl)biphenyl (B) was 18.6 parts by mass. The content of biphenyl compound (C) having a molecular structure in which biphenyl structures are bonded to each other through a methylene was 2.3 parts by mass. The content of biphenyl was 5.8 parts by mass. The remaining 8.1 parts by mass included unreacted raw materials other than biphenyl. The mass ratio (molar ratio) of isomers of the phenylbenzyl acrylate (A) [[ortho-phenylbenzyl acrylate]/[meta-phenylbenzyl acrylate]/[para-phenylbenzyl acrylate]] was 20/1/79.

Production Example 7

Production of mixture (2) of phenylbenzyl methacrylate (A), bis(acryloylmethyl)biphenyl (B), biphenyl, and biphenyl compound (C) having a molecular structure in which biphenyl structures are bonded to each other through a methylene The same process as in Synthesis of chloro intermediate described in Example 1 was conducted except that, 1061 g of phosphoric acid was added dropwise over 1 hour and the reaction was conducted for 45 hours. As a result, 995 g of a liquid sample was prepared.

Analysis of Sample

The resulting sample had a refractive index of 1.589 and a viscosity of 33 mPa·s in the form of a liquid at 25° C. The content of each component included in 100 parts of the sample was determined by gas chromatography. The content of phenylbenzyl acrylate (A) was 60.5 parts by mass. The content of bis(acryloylmethyl)biphenyl (B) was 23.0 parts by mass. The content of biphenyl compound (C) having a molecular structure in which biphenyl structures are bonded to each other through a methylene was 3.0 parts by mass. The content of biphenyl was 1.2 parts by mass. The remaining 12.3 parts by mass included unreacted raw materials other than biphenyl. The mass ratio (molar ratio) of isomers of the phenylbenzyl acrylate (A) [[ortho-phenylbenzyl acrylate]/[meta-phenylbenzyl acrylate]/[para-phenylbenzyl acrylate]] was 20.5/0.5/79.

Example 1

Blend of Radically Polymerizable Composition

A radically polymerizable composition (1) was prepared by mixing 100 parts by mass of the mixture (1) prepared in Production Example 6 with 4 parts by mass of a photopolymerization initiator ("Irgacure 184" produced by Ciba Specialty Chemicals Inc.).

Production of Cured Film

The radically polymerizable composition (1) prepared as described above was applied onto a chrome-plated metal sheet. A transparent PET film having an untreated surface was superposed onto a layer formed of the composition. The thickness of the layer formed of the composition was adjusted to 50 μm. The layer formed of the composition was cured by being irradiated with 500 mJ/cm$^2$ of ultraviolet ray using a high-pressure mercury lamp from the transparent-substrate side. Thus, a layered body was prepared. The cured layer formed of the radically polymerizable composition was removed from the metal sheet and the transparent PET film of the layered body. Thus, a cured film was prepared.

Production of Cured Film with PET Substrate

A layered body was prepared as in Production of cured film described above, except that a transparent PET film having a surface adhesive-treated was used instead of the transparent PET film having an untreated surface. Only the metal sheet was removed from the layered body. Thus, a cured film with a PET substrate was prepared.

Production of Cured Film with Glass Sheet

The radically polymerizable composition (1) prepared as described above was applied onto a glass sheet using a bar coater (No. 20) and subsequently irradiated with 500 mJ/cm$^2$ using a high-pressure mercury lamp having 120 W/cm$^2$ in an air atmosphere. Thus, a cured film with a glass sheet was prepared.

Evaluations

Various evaluations described below were conducted for the radically polymerizable composition (1), the cured film, the cured film with a PET substrate, and the cured film with a glass sheet prepared as described above.

Evaluation 1: Measurement of Refractive Index

For the radically polymerizable composition (1) and the cured film prepared as described above, a refractive index at 25° C. was measured using an Abbe refractometer ("NAR-3T" produced by ATAGO CO., LTD). The refractive index of the cured film was measured by bringing the film into contact with a prism of the Abbe refractometer using 1-bromonaphthalene.

Evaluation 2: Measurement of Viscosity

Measurement of the radically polymerizable composition (1) prepared as described above was conducted at 25° C. using an E-type rotational viscometer ("RE80U" produced by Toki Sangyo Co., Ltd.).

Evaluation 3: Crystal Precipitation Test

The radically polymerizable composition (1) prepared as described above was stored at 0° C. for 2 days. Subsequently, an evaluation was conducted on the basis of the presence or absence of precipitation of a crystal.

Good: Precipitation of a crystal was not observed.

Poor: Precipitation of a crystal was observed.

Evaluation 4: Heat Resistance Test

The cured film with a glass sheet was placed in a dryer maintained at 125° C. and kept for 150 hours. The resulting film was visually inspected for changes in hue and shape. Evaluation of heat resistance was conducted in accordance with the following criteria.

Good: No change was observed.

Fair: Changes in hue were observed, but no change in shape was observed.

Poor: Changes in hue and shape were observed.

Evaluation 5: Releasability Test

The radically polymerizable composition (1) prepared as described above was applied onto a chrome-plated prism-forming metal die. A transparent PET film having an untreated surface was superposed onto the layer formed of the composition, and the thickness of the layer formed of the composition was adjusted to 50 μm. The layer formed of the composition was cured by being irradiated with 500 mJ/cm$^2$ of ultraviolet ray using a high-pressure mercury lamp from the transparent-substrate side. An evaluation was conducted on the basis of the presence or absence of the cured product remaining on the metal die when a cured layer formed of the radically polymerizable composition was removed from the prism-forming metal die.

Good: No cured product remains on the metal die.

Poor: A cured product remains on the metal die.

Examples 2 to 9

Radically polymerizable compositions (2) to (9) were prepared as in Example 1 except that the blending was performed as shown in Table 1 instead of adding 100 parts by mass of the mixture (1) added in Example 1. For each of the radically polymerizable compositions (2) to (9), a cured film, a cured film with a PET substrate, and a cured film with a glass sheet were prepared, and various evaluation tests were conducted. Table 1 shows the evaluation results.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| radically polymerizable composition | (1) | (2) | (3) | (4) | (5) | (6) | (7) | (8) | (9) |
| ortho-phenylbenzyl acrylate (Production Example 1) |  |  | 40 | 90 | 55 | 20 | 45 | 55 |  |
| meta-phenylbenzyl acrylate (Production Example 2) |  |  |  |  |  |  |  |  |  |
| para-phenylbenzyl acrylate (Production Example 3) |  |  |  |  |  | 20 | 45 |  |  |
| 4,4'-bis(acryloylmethyl)biphenyl (Production Example 4) |  |  | 60 |  | 35 | 60 |  | 40 | 25 |
| biphenyl compound (Production Example 5) |  |  |  | 10 | 10 |  | 10 | 5 |  |
| mixture (1) (Production Example 6) | 100 |  |  |  |  |  |  |  | 75 |
| mixture (2) (Production Example 7) |  | 100 |  |  |  |  |  |  |  |
| refractive index of composition | 1.592 | 1.589 | 1.570 | 1.580 | 1.575 | 1.575 | 1.580 | 1.574 | 1.585 |
| refractive index of cured film | 1.623 | 1.621 | 1.610 | 1.614 | 1.610 | 1.610 | 1.625 | 1.605 | 1.617 |
| viscosity of composition | 30 | 33 | 100 | 182 | 150 | 98 | 180 | 40 | 50 |
| crystal precipitation test | Good | Good | Good | Good | Good | Good | Good | Good | Good |
| heat resistance test | Good | Good | Fair | Fair | Good | Fair | Fair | Good | Good |
| releasability test | Good | Good | Good | Fair | Good | Good | Fair | Good | Good |

Comparative Examples 1 to 4

Radically polymerizable compositions (1') to (4') were prepared as in Example 1 except that the blending was performed as shown in Table 2 instead of adding 100 parts by mass of the mixture (1) added in Example 1. Since the radically polymerizable compositions (1') to (4') prepared in Comparative Examples 1 to 4 were solid at ordinary temperature, measurement of viscosity and crystal precipitation test were omitted for the radically polymerizable compositions (1') to (4'). Preparation of various types of films and evaluation thereof were also omitted.

TABLE 2

|  | Comparative Example 1 | Comparative Example 2 | Comparative Example 3 | Comparative Example 4 |
|---|---|---|---|---|
| radically polymerizable composition | (1') | (2') | (3') | (4') |
| ortho-phenylbenzyl acrylate (Production Example 1) |  |  |  |  |
| meta-phenylbenzyl acrylate (Production Example 2) |  |  |  |  |
| para-phenylbenzyl acrylate (Production Example 3) | 100 |  |  |  |
| 4,4'-bis(acryloylmethyl)biphenyl (Production Example 4) |  | 100 |  | 50 |
| biphenyl compound (Production Example 5) |  |  | 100 | 50 |
| refractive index of composition | 1.592 (40° C.) | 1.565 (70° C.) | could not be measured | could not be measured |
| refractive index of cured film | — | — | — | — |
| viscosity of composition | solid | solid | solid | solid |
| crystal precipitation test | — | — | — | — |
| heat resistance test | — | — | — | — |
| releasability test | — | — | — | — |

Footnote of Table 2

The refractive index of the radically polymerizable composition was measured at 40° C. for the radically polymerizable composition (1') prepared in Comparative Example 3 and at 70° C. for the radically polymerizable composition (2') prepared in Comparative Example 4.

Production Example 8

Synthesis of (Meth)Acrylate Compound (Y1) Having Fluorene Skeleton

Into a 200-mL four-necked flask equipped with a stirrer, a thermometer, and a capacitor, 400.0 g of 9,9-bis[4-(2-hydroxyethoxy)phenyl]fluorene (produced by Wako Pure Chemical Industries, Ltd.), 1000 g of anhydrous toluene, 185 g of triethylamine, and 1.0 g of methoquinone were charged, and the mixture was cooled to 10° C. or less using an ice bath. Into the flask, 124 g of acryloyl chloride was added dropwise over 30 minutes. The temperature was increased to room temperature, and a reaction was conducted for two hours. After the completion of the reaction, the reaction solution was poured into water and washed with a 5% NaOH aqueous solution and a saline solution. Then, toluene was distilled off to prepare 497 g of a reaction composition. This reaction composition was purified using a silica gel column to prepare 465 g of (meth)acrylate compound (Y1) having a fluorene skeleton, the (meth)acrylate compound (Y1) being represented by formula (13) below. The compound (Y1) had a refractive index of 1.617 at 40° C. and was a solid that was colorless or slightly yellow in appearance.

[Chem. 8]

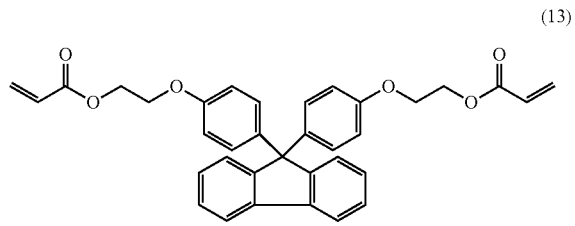

(13)

(meth)acrylate compound (Y2) having a fluorene skeleton: "OGSOL EA-0200" produced by Osaka Gas Chemicals Co., Ltd. was used as an example of a commercial product of the compound represented by formula (13) above.

(meth)acrylate compound (Z1): ortho-phenylphenoxyethyl acrylate ("ARONIX M-106" produced by Toagosei Co., Ltd.)

Examples 10 to 22

Radically polymerizable compositions (10) to (22) were prepared as in Example 1 except that blending was performed as shown in Tables 3 and 4 instead of adding 100 parts by mass of the mixture (1) added in Example 1. For each of the radically polymerizable compositions (10) to (22), a cured film, a cured film with a PET substrate, and a cured film with a glass sheet were prepared, and the evaluation tests conducted in Example 1 and various evaluation tests described below were conducted. Tables 3 and 4 show the evaluation results.

Evaluation 6: Transparency Test

The light transmissivity of the cured film in the wavelength range of 400 to 900 nm was measured.

Good: The transmissivity was 85% or more over the entire range.

Poor: The transmissivity was less than 85% in some parts of the range.

Evaluation 7: Adhesion Test

The cured film with a PET substrate was examined in accordance with JIS K5400 in terms of adhesion between the PET substrate and the cured product layer formed of the radically polymerizable composition.

Good: All grids remained.

Poor: Peeling occurred in some grids.

Evaluation 8: Resistance-to-Solvents Test

In the cured film with a glass sheet, the cured product layer formed of the radically polymerizable composition was rubbed 50 strokes with cotton swabs (produced by Johnson) containing methyl ethyl ketone, and subsequently the coating film was visually inspected for changes in the surface thereof.

Good: No change was observed.

Poor: Clouding, peeling, or the like was observed.

Evaluation 9: Moisture Resistance Test

The cured film with a glass sheet was placed in a thermo-hygrostat maintained at 85° C. and a humidity of 85% and kept for 300 hours. The resulting film was visually inspected for changes in hue and shape. Evaluation of heat resistance was conducted in accordance with the following criteria.

Good: No change was observed.

Fair: Changes in hue were observed, but no change in shape was observed.

Poor: Changes in hue and shape were observed.

TABLE 3

|  | Example 10 | Example 11 | Example 12 | Example 13 | Example 14 | Example 15 |
|---|---|---|---|---|---|---|
| radically polymerizable composition | (10) | (11) | (12) | (13) | (14) | (15) |
| ortho-phenylbenzyl acrylate (Production Example 1) |  |  |  |  |  | 20 |
| meta-phenylbenzyl acrylate (Production Example 2) |  |  |  |  |  |  |
| para-phenylbenzyl acrylate (Production Example 3) |  |  |  |  |  |  |
| 4,4'-bis(acryloylmethyl)biphenyl (Production Example 4) |  |  |  |  |  | 30 |
| biphenyl compound (Production Example 5) |  |  |  |  |  |  |
| mixture (1) (Production Example 6) | 50 | 50 | 40 | 70 |  |  |
| mixture (2) (Production Example 7) |  |  |  |  | 50 |  |
| compound (Y1) (Production Example 8) |  | 50 |  |  | 50 | 50 |
| compound (Y2) | 50 |  | 60 | 30 |  |  |
| compound (Z1) |  |  |  |  |  |  |

TABLE 3-continued

|  | Example 10 | Example 11 | Example 12 | Example 13 | Example 14 | Example 15 |
|---|---|---|---|---|---|---|
| refractive index of composition | 1.605 | 1.602 | 1.609 | 1.600 | 1.603 | 1.594 |
| refractive index of cured film | 1.637 | 1.634 | 1.641 | 1.632 | 1.635 | 1.625 |
| viscosity of composition | 3000 | 2800 | 4100 | 300 | 2900 | 3000 |
| crystal precipitation test | Good | Good | Good | Good | Good | Good |
| heat resistance test | Good | Good | Good | Good | Good | Good |
| releasability test | Good | Good | Good | Good | Good | Good |
| transparency test | Good | Good | Good | Good | Good | Good |
| adhesion test | Good | Good | Good | Good | Good | Good |
| resistance-to-solvents test | Good | Good | Good | Good | Good | Good |
| moisture resistance test | Good | Good | Good | Good | Good | Good |

TABLE 4

|  | Example 16 | Example 17 | Example 18 | Example 19 | Example 20 | Example 21 | Example 22 |
|---|---|---|---|---|---|---|---|
| radically polymerizable composition | (16) | (17) | (18) | (19) | (20) | (21) | (22) |
| ortho-phenylbenzyl acrylate (Production Example 1) | 45 | 27.5 | 10 | 22.5 | 27.5 |  |  |
| meta-phenylbenzyl acrylate (Production Example 2) |  |  |  |  |  |  |  |
| para-phenylbenzyl acrylate (Production Example 3) |  |  | 10 | 22.5 |  |  |  |
| 4,4'-bis(acryloylmethyl)biphenyl (Production Example 4) |  | 17.5 | 30 |  | 20 | 12.5 |  |
| biphenyl compound (Production Example 5) | 5 | 5 |  | 5 | 2.5 |  |  |
| mixture (1) (Production Example 6) |  |  |  |  |  | 37.5 | 50 |
| mixture (2) (Production Example 7) |  |  |  |  |  |  |  |
| compound (Y1) (Production Example 8) | 50 | 50 | 50 | 50 | 50 | 50 |  |
| compound (Y2) |  |  |  |  |  |  | 40 |
| compound (Z1) |  |  |  |  |  |  | 10 |
| refractive index of composition | 1.600 | 1.597 | 1.596 | 1.605 | 1.595 | 1.601 | 1.592 |
| refractive index of cured film | 1.632 | 1.629 | 1.628 | 1.637 | 1.627 | 1.633 | 1.623 |
| viscosity of composition | 3200 | 3050 | 3100 | 3150 | 3100 | 3300 | 2700 |
| crystal precipitation test | Good | Good | Good | Good | Good | Good | Good |
| heat resistance test | Good | Good | Good | Good | Good | Good | Good |
| releasability test | Good | Good | Good | Good | Good | Good | Good |
| transparency test | Good | Good | Good | Good | Good | Good | Good |
| adhesion test | Good | Good | Good | Good | Good | Good | Good |
| resistance-to-solvents test | Good | Good | Good | Good | Good | Good | Good |
| moisture resistance test | Good | Good | Good | Good | Good | Good | Good |

Comparative Examples 5 to 9

Radically polymerizable compositions (7') to (9') were prepared as in Example 1 except that the blending was performed as shown in Table 5 instead of adding 100 parts by mass of mixture (1) added in Example 1. For each of these radically polymerizable compositions, a cured film, a cured film with a PET substrate, and a cured film with a glass sheet were prepared, and various evaluation tests were conducted as in Example 10. Table 5 shows the evaluation results.

TABLE 5

|  | Comparative Example 5 | Comparative Example 6 | Comparative Example 7 | Comparative Example 8 | Comparative Example 9 |
|---|---|---|---|---|---|
| radically polymerizable composition | (5') | (6') | (7') | (8') | (9') |
| ortho-phenylbenzyl acrylate (Production Example 1) |  |  |  |  |  |
| meta-phenylbenzyl acrylate (Production Example 2) |  |  |  |  |  |
| para-phenylbenzyl acrylate (Production Example 3) | 50 |  |  |  |  |

TABLE 5-continued

| | Comparative Example 5 | Comparative Example 6 | Comparative Example 7 | Comparative Example 8 | Comparative Example 9 |
|---|---|---|---|---|---|
| 4,4'-bis(acryloylmethyl)biphenyl (Production Example 4) | | 50 | | 25 | |
| biphenyl compound (Production Example 5) | | | 50 | 25 | |
| compound (Y1) (Production Example 8) | | | 50 | 50 | |
| compound (Y2) | 50 | 50 | | | 50 |
| compound (Z1) | | | | | 50 |
| refractive index of composition | 1.606 | 1.591 | 1.609 | 1.600 | 1.597 |
| refractive index of cured film | 1.638 | 1.623 | — | — | 1.617 |
| viscosity of composition | 14000 | 15000 | could not be measured | could not be measured | 12800 |
| crystal precipitation test | Poor | Poor | — | — | Good |
| heat resistance test | Good | Good | — | — | Good |
| releasability test | Poor | Poor | — | — | Poor |
| transparency test | Good | Good | — | — | Good |
| adhesion test | Poor | Poor | — | — | Poor |
| resistance-to-solvents test | Good | Good | — | — | Good |
| moisture resistance test | Good | Good | — | — | Good |

INDUSTRIAL APPLICABILITY

The composition according to the present invention is useful as a resin material for optical parts including plastic lens, such as a prism sheet.

The invention claimed is:

1. A radically polymerizable composition comprising, as essential components, phenylbenzyl (meth)acrylate (A) and a biphenyl compound (C) having a molecular structure constituted by biphenyl structures bonded to each other through a methylene, the phenylbenzyl (meth)acrylate (A) including ortho-phenylbenzyl (meth)acrylate and para-phenylbenzyl (meth)acrylate in a molar ratio of 55/45 to 10/90.

2. The radically polymerizable composition according to claim 1, further comprising bis[(meth)acryloylmethyl]biphenyl (B) as an essential component, in addition to the phenylbenzyl (meth)acrylate (A) and the biphenyl compound (C) having a molecular structure constituted by biphenyl structures bonded to each other through a methylene.

3. The radically polymerizable composition according to claim 2, wherein a content of the phenylbenzyl (meth)acrylate (A) is 30 to 95 parts by mass relative to 100 parts by mass in total of the phenylbenzyl (meth)acrylate (A), the bis[(meth)acryloylmethyl]biphenyl (B), and the biphenyl compound (C) having a molecular structure constituted by biphenyl structures bonded to each other through a methylene.

4. The radically polymerizable composition according to claim 2, wherein a content of the bis[(meth)acryloylmethyl]biphenyl (B) is 5 to 70 parts by mass relative to 100 parts by mass in total of the phenylbenzyl (meth)acrylate (A), the bis[(meth)acryloylmethyl]biphenyl (B), and the biphenyl compound (C) having a molecular structure constituted by biphenyl structures bonded to each other through a methylene.

5. The radically polymerizable composition according to claim 2, wherein a content of the biphenyl compound (C) having a molecular structure constituted by biphenyl structures bonded to each other through a methylene is 0.5 to 15 parts by mass relative to 100 parts by mass in total of the phenylbenzyl (meth)acrylate (A), the bis[(meth)acryloylmethyl]biphenyl (B), and the biphenyl compound (C) having a molecular structure constituted by biphenyl structures bonded to each other through a methylene.

6. A radically polymerizable composition produced through the steps of reacting biphenyl with a hydrogen halide, and a formaldehyde derivative to prepare a reaction mixture and further reacting the reaction mixture with acrylic acid or an alkali metal acrylate, wherein the total mass of the phenylbenzyl (meth)acrylate (A), the bis[(meth)acryloylmethyl]biphenyl (B), and the biphenyl compound (C) having a molecular structure constituted by biphenyl structures bonded to each other through a methylene is 50 to 95 parts by mass relative to 100 parts by mass of the composition.

7. The radically polymerizable composition according to claim 2, further comprising a (meth)acrylate compound (Y) having a fluorene skeleton in its molecular structure, in addition to the phenylbenzyl (meth)acrylate (A), the bis[(meth)acryloylmethyl]biphenyl (B), and the biphenyl compound (C) having a molecular structure constituted by biphenyl structures bonded to each other through a methylene.

8. The radically polymerizable composition according to claim 7, wherein a content of the (meth)acrylate compound (Y) having a fluorene skeleton in its molecular structure is 15 to 80 parts by mass relative to 100 parts by mass in total of the phenylbenzyl (meth)acrylate (A), the bis[(meth)acryloylmethyl]biphenyl (B), the biphenyl compound (C) having a molecular structure constituted by biphenyl structures bonded to each other through a methylene, and the (meth)acrylate compound (Y) having a fluorene skeleton in its molecular structure.

9. A cured product of the radically polymerizable composition according to claim 1.

10. A plastic lens formed by curing the radically polymerizable composition according to claim 1.

11. A cured product of the radically polymerizable composition according to claim 2.

12. A cured product of the radically polymerizable composition according to claim 3.

13. A cured product of the radically polymerizable composition according to claim 4.

14. A cured product of the radically polymerizable composition according to claim 5.

15. A cured product of the radically polymerizable composition according to claim 6.

16. A plastic lens formed by curing the radically polymerizable composition according to claim 2.

17. A plastic lens formed by curing the radically polymerizable composition according to claim 3.

18. A plastic lens formed by curing the radically polymerizable composition according to claim 4.

19. A plastic lens formed by curing the radically polymerizable composition according to claim 5.

20. A plastic lens formed by curing the radically polymerizable composition according to claim 6.

* * * * *